United States Patent
Takahashi et al.

(10) Patent No.: US 9,824,674 B2
(45) Date of Patent: Nov. 21, 2017

(54) RECORDING METHOD, RECORDING SYSTEM, RECORDING PROGRAM STORAGE MEDIUM, ACOUSTIC PROCESSING METHOD, AND ACOUSTIC PROCESSING DEVICE

(71) Applicant: Yamaha Corporation, Hamamatsu-shi, Shizuoka-Ken (JP)

(72) Inventors: Yu Takahashi, Hamamatsu (JP);
Kazunobu Kondo, Toyohashi (JP);
Motoichi Tamura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 175 days.

(21) Appl. No.: 14/514,743

(22) Filed: Oct. 15, 2014

(65) Prior Publication Data

US 2015/0104043 A1  Apr. 16, 2015

(30) Foreign Application Priority Data

Oct. 16, 2013 (JP) .................................. 2013-215708
Sep. 29, 2014 (JP) .................................. 2014-198056

(51) Int. Cl.
*H04B 1/00* (2006.01)
*G10H 7/00* (2006.01)
(Continued)

(52) U.S. Cl.
CPC .............. *G10H 7/00* (2013.01); *G11B 27/031* (2013.01); *G11B 27/10* (2013.01); *H04W 56/0005* (2013.01); *G10H 2210/131* (2013.01)

(58) Field of Classification Search
CPC ...... H04R 2420/01; H04R 25/43; G10H 7/00; G10H 2210/131; H04W 56/0005; G11B 27/10; G11B 27/031
(Continued)

(56) References Cited

U.S. PATENT DOCUMENTS 5,925,843 A * 7/1999 Miller .................. G10H 1/0041
84/477 R
2005/0049735 A1 * 3/2005 Kim ........................ G06F 17/00
700/94
(Continued)

FOREIGN PATENT DOCUMENTS

JP       2003-250200 A    9/2003
WO    WO 2009/026347 A1  2/2009

OTHER PUBLICATIONS

European Search Report dated May 12, 2015 (five pages).
(Continued)

*Primary Examiner* — William A Jerez Lora
(74) *Attorney, Agent, or Firm* — Crowell & Moring LLP

(57) ABSTRACT

A recording method includes acquiring each piece of acoustic data representing a sound from each of a plurality of portable terminal devices. The each of the plurality of portable terminal devices includes a recording unit configured to generate the piece of acoustic data. The recording method also includes executing synchronization processing for synchronizing the respective pieces of acoustic data and executing mixing processing for mixing a plurality of pieces of acoustic data for which the synchronization processing has been executed.

15 Claims, 7 Drawing Sheets

(51) Int. Cl.
*H04W 56/00* (2009.01)
*G11B 27/031* (2006.01)
*G11B 27/10* (2006.01)

(58) Field of Classification Search
USPC .............................................. 381/56, 58, 119
See application file for complete search history.

(56) References Cited

U.S. PATENT DOCUMENTS

2009/0068943 A1* 3/2009 Grandinetti .......... G10H 1/0083
455/3.06
2012/0323606 A1* 12/2012 Ananthasubramaniam ................
G06F 19/3418
705/3

OTHER PUBLICATIONS

Kim et al. "Collaborative Audio Enhancement using Probabilistic Latent Component Sharing" IEEE International Conference on Acoustics, Speech and Signal Processing et al. May 26, 2013, pp. 896-900, University of Illinois at Urbana-Champaign Department of Computer Science et al., XP 032508371.

Miyabe et al. "Efficient Maximum Likelihood Solution Search of Linear Phase Compensation for Blind Synchronization of Asynchronized Recording", Proc. of the Spring Meeting of the Acoustical Society of Japan, 2013, pp. 733-736, with partial English translation.

Dugan "Automatic Microphone Mixing", Journal of the Audio Engineering Society, May 14, 1975, pp. 442-449, vol. 23, No. 6, San Francisco, California.

Scott et al. "Automatic Multi-Track Mixing using Linear Dynamical Systems", Proc. SMC, 2011, six pages, Drexel University-Electrical and Computer Engineering.

Misra et al. "Efficient Cross-Correlation Via Sparse Representation in Sensor Networks", IPSN, 2012, 12 pages, School of Computer Science and Engineering, The University of New South Wales, Sydney Australia; Autonomous Systems Laboratory, CSIRO ICT Centre, Brisbane, Australia.

* cited by examiner

RECORDING METHOD, RECORDING SYSTEM, RECORDING PROGRAM STORAGE MEDIUM, ACOUSTIC PROCESSING METHOD, AND ACOUSTIC PROCESSING DEVICE

CROSS-REFERENCE TO RELATED APPLICATION

The present application claims priority from Japanese Applications JP 2013-215708 and JP 2014-198056, the content to which is hereby incorporated by reference into this application.

BACKGROUND OF THE INVENTION

1. Field of the Invention

The present invention relates to a recording method, a recording system, a recording program storage medium, an acoustic processing method, and an acoustic processing device.

2. Description of the Related Art

For example, in Japanese Patent Application Laid-open No. 2003-250200, there is disclosed a multi-channel recording system for picking up sounds emitted from a plurality of sound generating sources such as singers and musical instruments situated within an acoustic space by using a plurality of sound pickup devices and then mixing the sounds. According to the technology disclosed in Japanese Patent Application Laid-open No. 2003-250200, it is possible to generate an acoustic signal that allows a listener to perceive a sound field providing realism.

SUMMARY OF THE INVENTION

However, in the technology disclosed in Japanese Patent Application Laid-open No. 2003-250200, it is necessary to provide a large-scale recording system including a large number of sound pickup devices whose number corresponds to a total number of sound generating sources within an acoustic space. In view of the above-mentioned circumstances, it is an object of one or more embodiments of the present invention to simplify a configuration of a recording system.

In one or more embodiments of the present invention, a recording system includes a plurality of portable terminal devices. Each of the plurality of portable terminal devices including a recording unit configured to generate a piece of acoustic data representing a sound. The recording system also includes a synchronization processing unit configured to acquire the pieces of acoustic data from the plurality of portable terminal devices, respectively, and execute synchronization processing for synchronizing the respective pieces of acoustic data and a mixing processing unit configured to execute mixing processing for mixing a plurality of pieces of acoustic data for which the synchronization processing has been executed. With the above-mentioned configuration, the acoustic data are generated by the respective terminal devices, and the synchronization processing and the mixing processing are executed for the acoustic data obtained after the recording performed by the respective terminal devices. Thus, advantageously the entire configuration is simplified (downsized) compared with the related-art recording system in which a large number of sound pickup devices are connected to one another.

DETAILED DESCRIPTION OF THE INVENTION

Figure 1:
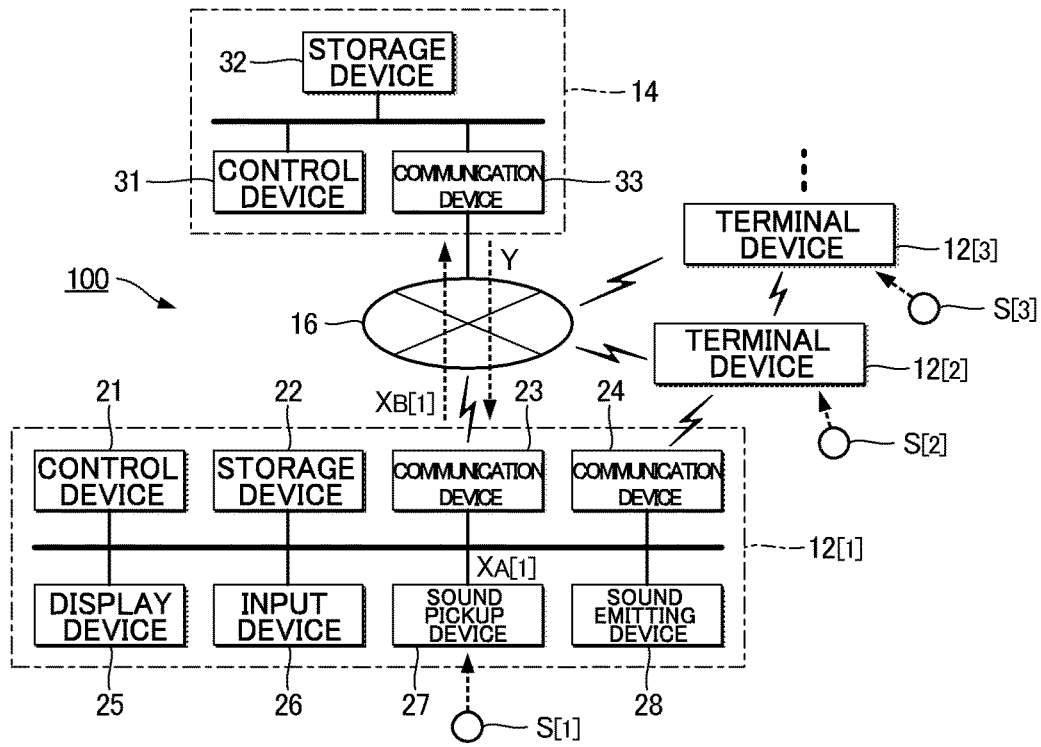
FIG. 1 is a configuration diagram of a recording system according to an embodiment of the present invention.

FIG. 1 is a configuration diagram of a recording system 100 according to an exemplary embodiment of the present invention. The recording system 100 according to this embodiment is an acoustic system for recording a sound emitted from K (K is a natural number of 2 or more) sound generating sources S[1] to S[K] situated within an acoustic space such as a recording studio or a concert hall. Each of the sound generating source S[k] (k=1 to K) within the acoustic space is a singer or a musical instrument that emits a sound (singing sound or musical sound) of each of mutually different musical performance parts of an arbitrary music piece (hereinafter referred to as "target musical piece"). In other words, the recording system 100 according to this embodiment is used to record a musical performance sound of the target musical piece composed of a plurality of musical performance parts. As exemplified in FIG. 1, the recording system 100 includes K terminal devices 12[1] to 12[K] corresponding to mutually different sound generating sources S[k] within the acoustic space, respectively, and an acoustic processing device 14. The acoustic processing device 14 according to this embodiment is implemented by, for example, a server device such as a web server. Each terminal device 12[k] is, for example, a communication terminal for interactively communicating to/from the acoustic processing device 14 through a communication network 16 such as a mobile communication network or the Internet. For example, it is preferred that a mobile phone, a smartphone, or a tablet terminal be used as the terminal device 12[k].

As exemplified typically by an arbitrary one terminal device 12[1] in FIG. 1, each terminal device 12[k] is implemented by a computer system including a control device 21, a storage device 22, a communication device 23, a communication device 24, a display device 25, an input device 26, a sound pickup device 27, and a sound emitting device 28. The control device 21 is a processor (for example CPU or DSP (digital signal processor)) for executing different kinds of control processing and arithmetic operation processing by executing a program stored in the storage device 22. The storage device 22 (for example, semiconductor recording medium) stores the program to be executed by the control device 21 and various kinds of data to be used by the control device 21.

The communication device 23 communicates to/from the acoustic processing device 14 through the communication network 16. Wireless communications are performed between the communication device 23 and the communication network 16. The communication device 24 executes short-range wireless communications (communications performed without using the communication network 16) to/from another terminal device 12[k] within the acoustic space. For example, it is preferred that the short-range wireless communications using Bluetooth (trademark), Wi-Fi (trademark), or the like be employed as a communication method by the communication device 24. As described above, the communication device 23 and the communication device 24 execute communications of methods that are different from each other.

The display device 25 (for example, liquid crystal display panel) displays an image specified by the control device 21. The input device 26 is an operating device for receiving an instruction from a user through the terminal device 12[k], and includes, for example, a plurality of operators operated by the user. Note that, the touch panel formed integrally with the display device 25 may be used as the input device 26. The sound emitting device (for example, speakers or headphones) 28 emits the sound specified by the control device 21.

The sound pickup device 27 of the terminal device 12[k] generates a piece of acoustic data XA[k] by picking up a surrounding sound within the acoustic space. The piece of acoustic data XA[k] is a numerical value string expressing a temporal waveform of the sound. The terminal device 12[k] is held in a state (on-mic) in which the sound pickup device 27 is brought into proximity to the sound generating source S[k]. Therefore, the sound expressed by the piece of acoustic data XA[k] dominantly includes the sound emitted from the sound generating source S[k], but also includes a sound (overlapping sound) that has been emitted from another sound generating source S and has reached the sound pickup device 27 of the terminal device 12[k]. Note that, an illustration of an A/D converter for converting for an analog acoustic signal obtained immediately after the sound pickup performed by the sound pickup device 27 into a piece of digital acoustic data XA[k] is omitted for the sake of convenience. The control device 21 generates a piece of acoustic data XB[k] by editing (processing) the piece of acoustic data XA[k] generated by the sound pickup device 27.

The acoustic processing device 14 illustrated in FIG. 1 is a signal processing device for generating acoustic data Y from pieces of acoustic data XB[1] to XB[K] having K systems (K channels) generated by the respective terminal devices 12, and is implemented by a computer system including a control device 31, a storage device 32, and a communication device 33. Note that, the acoustic processing device 14 may be implemented by a plurality of devices (for example, plurality of server devices that communicate to/from each other through the communication network 16) formed separately from one another.

The control device 31 is a processor for executing different kinds of control processing and arithmetic operation processing by executing a program stored in the storage device 32. For example, the control device 31 generates the acoustic data Y by mixing the pieces of acoustic data XB[1] to XB[K] having the K systems (K channels) generated by the respective terminal devices 12. The storage device 32 stores the program to be executed by the control device 31 and various kinds of data to be used by the control device 31. For example, a known recording medium such as a semiconductor recording medium or a magnetic recording medium or a combination of a plurality of the recording media may be employed as the storage device 32. Note that, another configuration may be employed in which the acoustic processing device 14 executes writing and reading of information through the communication network 16 to and from the storage device 32 provided to an external device (for example, server device) provided separately from the acoustic processing device 14. The communication device 33 communicates to/from each of the terminal devices 12[k] through the communication network 16.

Figure 2:
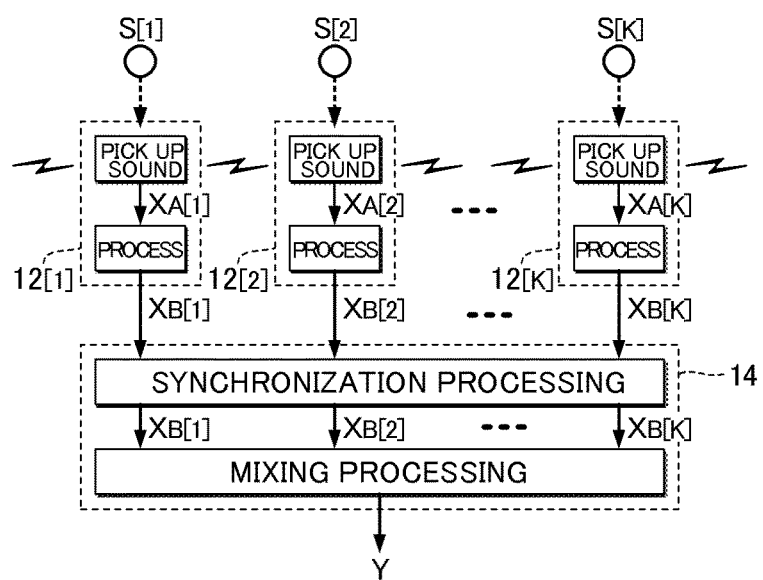
FIG. 2 is an explanatory diagram of a schematic operation of the recording system.

FIG. 2 is an explanatory diagram of a schematic operation of the recording system 100 according to this embodiment. As understood from FIG. 2, the piece of acoustic data XA[k] is generated by the sound pickup device 27 and the piece of acoustic data XA[k] are edited (generation of the piece of acoustic data XB[k]) on each of the terminal devices 12[k] in parallel. The acoustic processing device 14 acquires the pieces of acoustic data XB[k] (XB[1] to XB[K]) obtained after the editing from the respective terminal devices 12[k], and executes synchronization processing and mixing processing. The synchronization processing is signal processing for adjusting the respective pieces of acoustic data XB[k] so that time series of the sounds expressed by the respective pieces of acoustic data XB[k] are synchronized with one another on a time axis (in other words, beats of the sounds expressed by the respective pieces of acoustic data XB[k] match one another on the time axis). Further, the mixing processing is signal processing for generating the acoustic data Y by mixing (weight summing) the K pieces of acoustic data XB[1] to XB[K] obtained after execution of the synchronization processing. The piece of acoustic data Y generated by the acoustic processing device 14 is transmitted to each of the terminal devices 12[k], and supplied to the sound emitting device 28, to thereby be emitted as a sound. Therefore, the musical performance sound of the target musical piece in which musical sounds from a plurality of musical performance parts are synchronized with one another is emitted from the sound emitting device 28.

Figure 3:
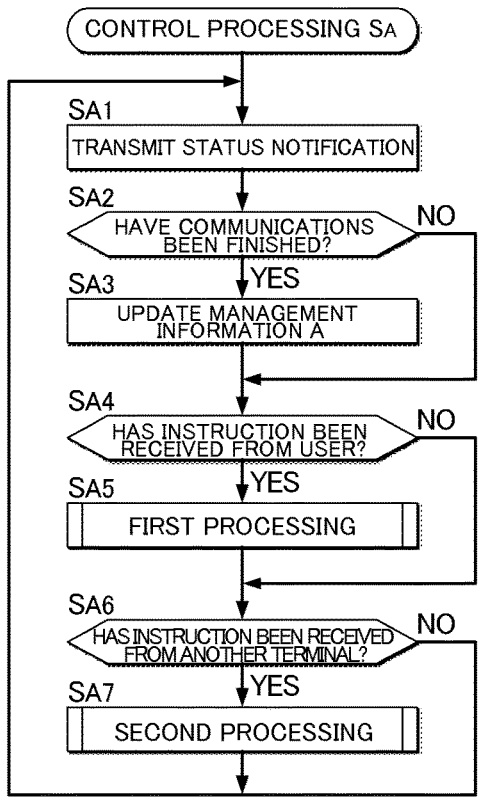
FIG. 3 is a flowchart of control processing.
Figure 4:
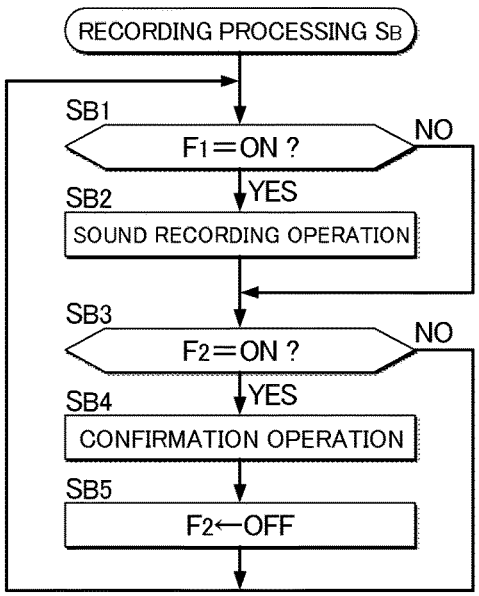
FIG. 4 is a flowchart of recording processing.

An arbitrary one of the terminal devices 12[k] executes control processing SA illustrated in FIG. 3 and recording processing SB illustrated in FIG. 4. The control processing SA illustrated in FIG. 3 is overall processing relating to the piece of acoustic data XA[k], and the recording processing SB illustrated in FIG. 4 is processing for storing the piece of acoustic data XA[k] in the storage device 22. The control processing SA and the recording processing SB are started with, for example, the instruction received from the user through the input device 26 as a trigger, and is executed in parallel with each other. Note that, in the following description, attention is focused on one terminal device 12[k], but in actuality, the same processing is executed on each of the K terminal devices 12[1] to 12[K].

<Control Processing SA>

Figure 5:
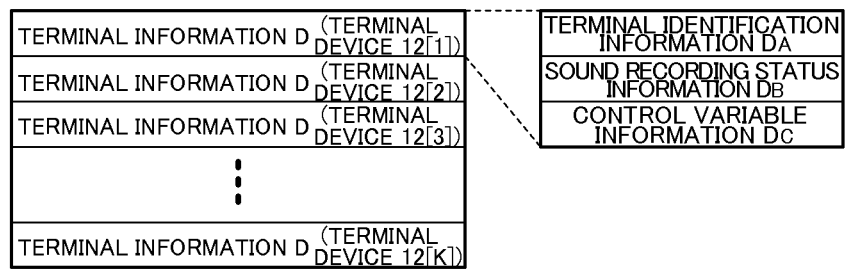
FIG. 5 is a schematic diagram of management information.

Management information A is used for the control processing SA. The management information A is stored in the storage device 22 of the respective terminal devices 12[k]. As exemplified in FIG. 5, the management information A according to this embodiment is a data table in which terminal information D is registered in each of the terminal devices 12[k] used to record the pieces of acoustic data XA[k]. The terminal information D includes terminal identification information DA, sound recording status information DB, and control variable information DC. The terminal identification information DA is information for identifying the terminal device 12[k]. The sound recording status information DB is information indicating a sound recording status of the piece of acoustic data XA[k]. The sound recording status information DB according to this embodiment specifies a volume of the piece of acoustic data XA[k] generated by the sound pickup device 27. Therefore, the sound recording status information DB is updated every moment in accordance with the sound emitted from the sound generating source S[k]. Further, the control variable information DC specifies a numerical value of a variable applied to the editing of the piece of acoustic data XA[k]. The control variable information DC according to this embodiment specifies a sound recording level (gain) of the piece of acoustic data XA[k]. As described below in detail, the management information A stored in each of the storage devices 22 of the terminal devices 12[k] is updated as needed based on the short-range wireless communications performed by the communication device 24 so that the management information A maintains the same contents as one another across the K terminal devices 12[1] to 12[K].

When the control processing SA illustrated in FIG. 3 is started, the control device 21 of the terminal device 12[k] transmits a status notification for notifying of the sound recording status of the own device from the communication device 24 to the other (K−1) terminal devices 12 (hereinafter referred to as "another terminal" or "the other terminals") (SA1). The status notification includes the terminal identification information DA and the sound recording status information DB on the terminal device 12[k]. The status notification is exchanged among the respective terminal devices 12[k].

The control device 21 determines whether or not the communications to/from another terminal have been disconnected (SA2). For example, the control device 21 determines that the communications to/from another terminal from which a predetermined time period has elapsed since the last status notification was received (in other words, another terminal that has not transmitted the status notification for a predetermined time period) have been disconnected. When the communications to/from another terminal are disconnected ("YES" in Step SA2), the control device 21 of the terminal device 12[k] updates the management information A on the storage device 22 (SA3). Specifically, the control device 21 deletes the terminal information D (terminal identification information DA, sound recording status information DB, and control variable information DC) on another terminal the communications to/from which have been disconnected from the management information A. On the other hand, when the disconnection of the communications to/from another terminal has not occurred ("NO" in Step SA2), the management information A (SA3) is not updated.

The control device 21 determines whether or not the instruction has been received from the user through the input device 26 of the terminal device 12[k] (SA4). When the instruction is received from the user ("YES" in Step SA4), the control device 21 executes first processing in accordance with the instruction received from the user (SA5). On the other hand, when the instruction is not received through the input device 26 ("NO" in Step SA4), without executing the first processing SA5, the control device 21 determines whether or not the communication device 24 has received the instruction (notification or request) transmitted from another terminal (SA6). When the instruction is received from another terminal ("YES" in Step SA6), the control device 21 executes second processing in accordance with the instruction received from another terminal (SA7). On the other hand, when the instruction is not received from another terminal ("NO" in Step SA6), without executing the second processing SA7, the control device 21 returns the processing to Step SA1 to repeat the above-mentioned processing steps (SA1 to SA7).

<Recording Processing SB>

A sound-recording-in-process flag F1 and a sound-recording-stop flag F2 are used for the recording processing SB illustrated in FIG. 4. The sound-recording-in-process flag F1 is information indicating whether or not an operation (hereinafter referred to as "sound recording operation") for storing the piece of acoustic data XA[k] supplied from the sound pickup device 27 in the storage device 22 is being executed. Specifically, the sound-recording-in-process flag F1 is set to an effective status (on) during the execution of the sound recording operation. On the other hand, the sound-recording-stop flag F2 is set to an effective status (on) when the sound recording operation is to be stopped (for example, when an instruction to stop the sound recording operation is issued).

When the recording processing SB is started, the control device 21 of the terminal device 12[k] determines whether or not the sound-recording-in-process flag F1 is the effective status (on) (SB1). When the sound-recording-in-process flag F1 is the effective status ("YES" in Step SB1), the control device 21 executes the sound recording operation for storing the piece of acoustic data XA[k] supplied from the sound pickup device 27 in the storage device 22 (SB2). On the other hand, when the sound-recording-in-process flag F1 is an ineffective status (off) ("NO" in Step SB1), the control device 21 determines whether or not the sound-recording-stop flag F2 is the effective status (on) without executing the sound recording operation (SB3). When the sound-recording-stop flag F2 is the effective status ("YES" in Step SB3), the control device 21 executes an operation (hereinafter referred to as "confirmation operation") for confirming the piece of acoustic data XA[k] that has been stored in the storage device 22 in the sound recording operation until a current time point (SB4). The confirmation operation is, for example, processing for confirming a file by adding identification information QA and sound recording identification information QB to the piece of acoustic data XA[k]. The identification information QA is a code (for example, file name) for identifying the piece of acoustic data XA[k], and is set for each of the terminal devices 12[k] in accordance with the instruction received from the user. The sound recording identification information QB is a code (for example, sound recording date/time) for identifying the sound recording of the target musical piece. In other words, common sound recording identification information QB is added to K pieces of acoustic data XA[1] to XA[K] generated in parallel (in other words, at one time of sound recording) with one another in a common acoustic space. When the above-mentioned processing is executed, the control device 21 changes the sound-recording-stop flag F2 to the ineffective status (off) (SB5). When the sound-recording-stop flag F2 is the ineffective status ("NO" in Step SB3), the confirmation operation (SB4) for the piece of acoustic data XA[k] and the changing (SB5) of the sound-recording-stop flag F2 are inhibited from being executed. The recording processing SB described above is repeated in order.

<First Processing SA5/Second Processing SA7>

Figure 6:
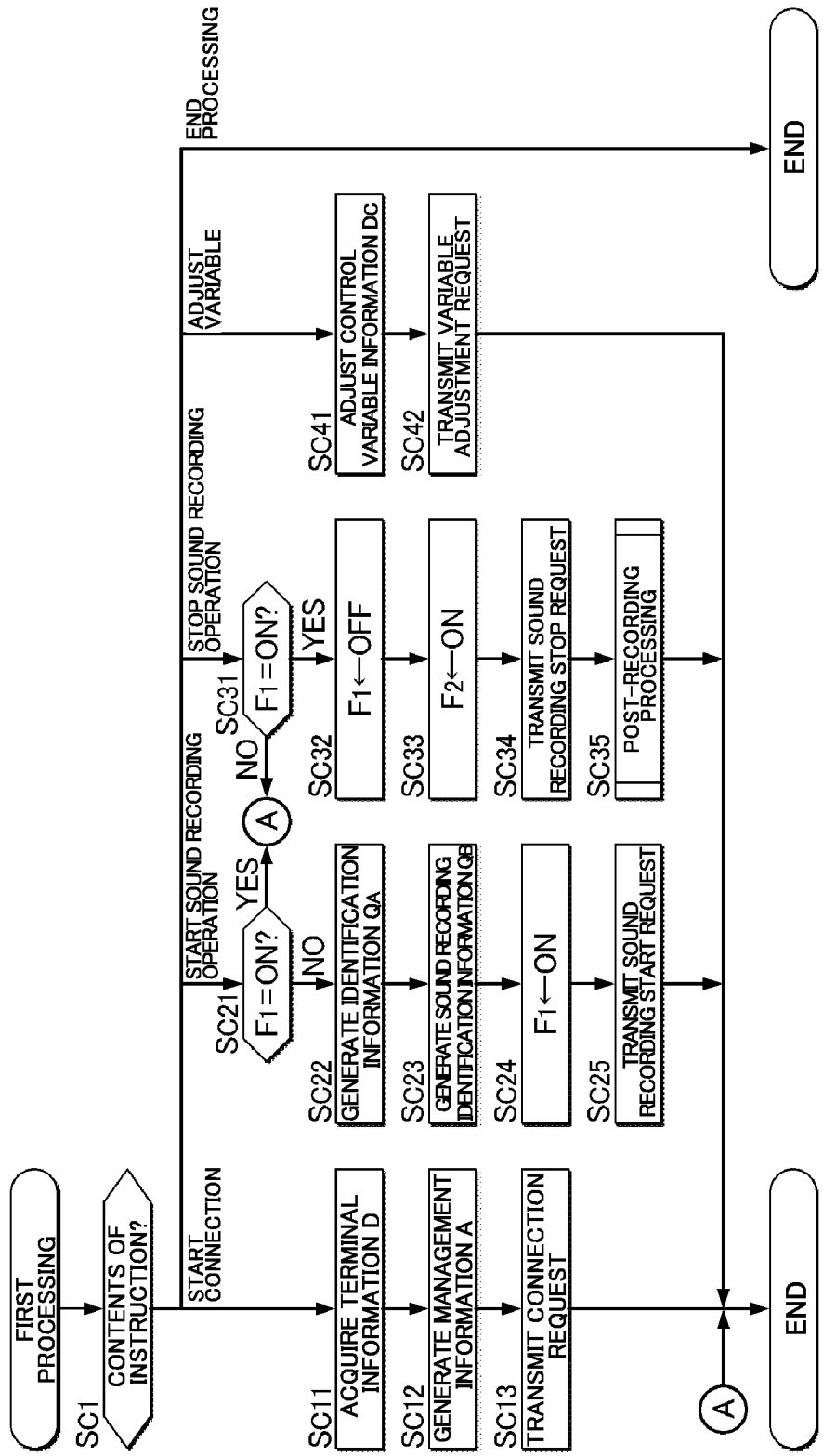
FIG. 6 is a flowchart of first processing.
Figure 7:
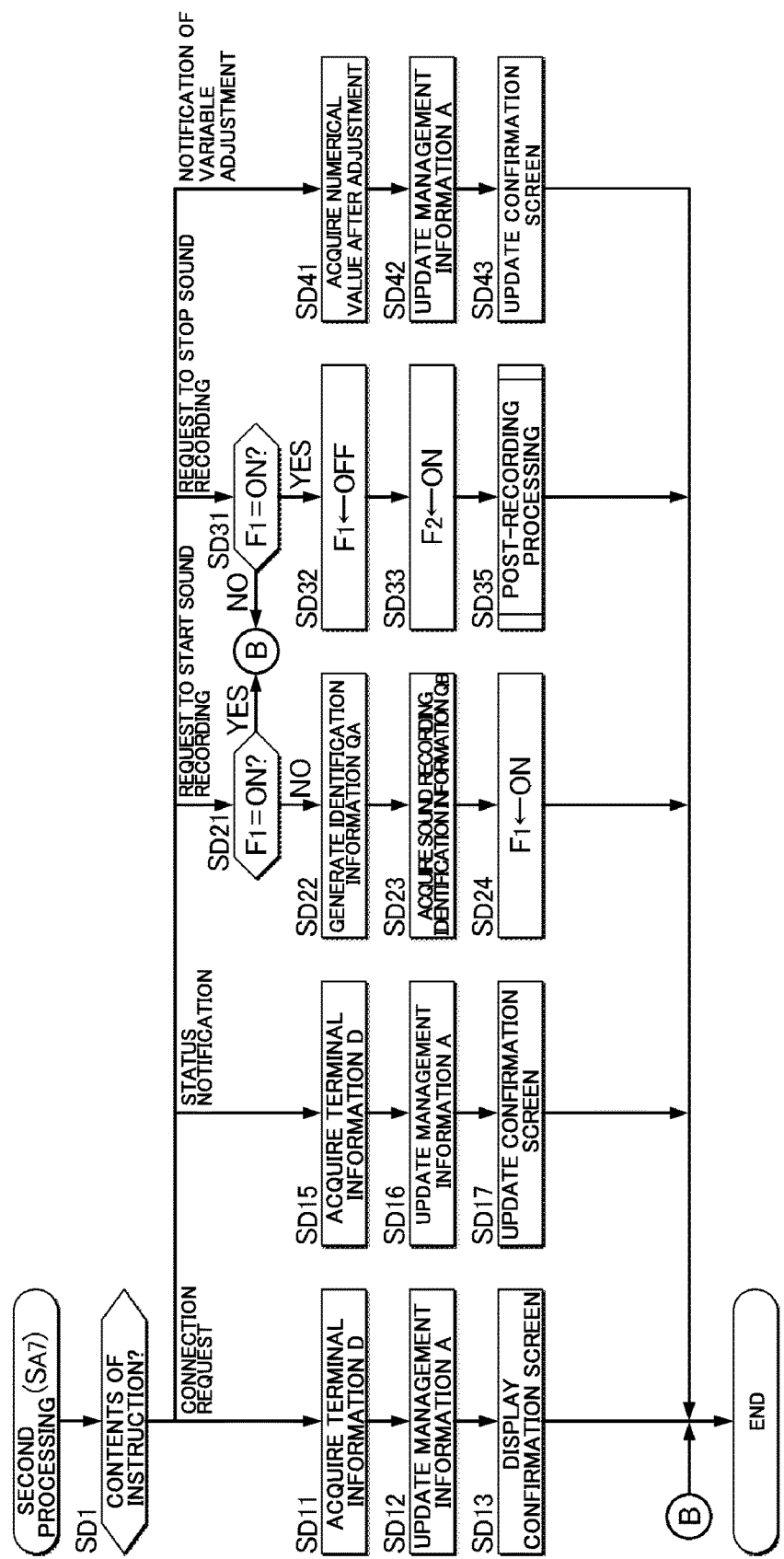
FIG. 7 is a flowchart of second processing.

FIG. 6 is a flowchart of the first processing SA5 executed by the control device 21 of the terminal device 12[k] when the instruction is received from the user through the input device 26 ("YES" in Step SA4). The user can instruct the terminal device 12[k] to execute any one of a plurality of operations (for starting connection, starting sound recording operation, stopping the sound recording operation, adjusting the variable, and finishing the processing) by appropriately operating the input device 26 of the terminal device 12[k]. When the first processing SA5 is started, the control device 21 discriminates contents of the instruction received from the user (SC1), and executes processing corresponding to the contents of the instruction. In the first processing SA5, an instruction (connection request, sound recording start request, recording stop request, the variable adjustment notification) for another terminal is transmitted in accordance with the instruction received from the user through the terminal device 12[$k$]. FIG. 7 is a flowchart of the second processing SA7 executed by the control device 21 of the terminal device 12[$k$] when the instruction received from another terminal is received ("YES" in Step SA6). When the second processing SA7 is started, the control device 21 discriminates the contents of the instruction received from another terminal by the communication device 24 (SD1), and executes the processing corresponding to the contents of the instruction. Each of the terminal devices 12[$k$] may receive both the instruction received from the user through the input device 26 of the own device and the instruction received from another terminal.

The user of each of the terminal devices 12[$k$] who has instructed each of the terminal devices 12[$k$] to start the control processing SA and the recording processing SB appropriately operates the input device 26 to instruct the terminal device 12[$k$] to start the connection prior to the sound recording of the target musical piece. The instruction to start the connection is an instruction for causing each of the terminal devices 12[$k$] to be recognized as a recording device for the piece of acoustic data XA[$k$] by another terminal. When instructed to start the connection by the user, as exemplified in FIG. 6, the control device 21 of the terminal device 12[$k$] identifies the terminal information D on the own device (terminal device 12[$k$]) (SC11), and generates the management information A including the terminal information D and stores the management information A in the storage device 22 (SC12). Further, the control device 21 transmits the connection request from the communication device 24 to each of the other terminals (SC13). The connection request includes the terminal information D (terminal identification information DA, sound recording status information DB, and control variable information DC) acquired in Step SC11.

Figure 8:
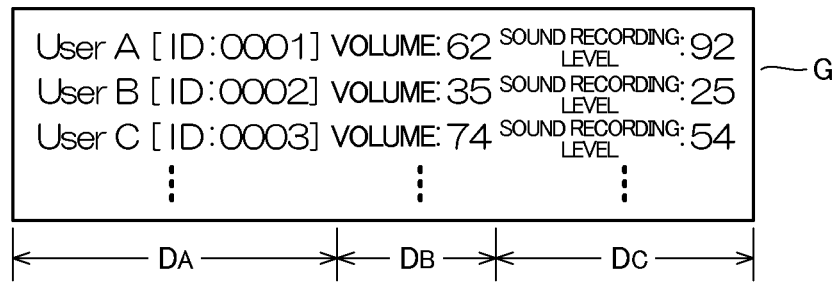
FIG. 8 is a schematic diagram of a review screen.

When the connection request transmitted from another terminal by the above-mentioned procedure is received, as exemplified in FIG. 7, the control device 21 of the terminal device 12[$k$] acquires the terminal information D contained in the connection request received from another terminal (SD11), and adds the terminal information D on another terminal to the management information A stored in the storage device 22 (SD12). Then, the control device 21 displays a review screen G representing the updated management information A as illustrated in FIG. 8 on the display device 25 (SD13). As understood from FIG. 8, the review screen G is an image for presenting the terminal information D on each of the terminal devices 12[$k$] to the user. In other words, the terminal identification information DA, the sound recording status information DB, and the control variable information DC are displayed on the display device 25 for each of the terminal devices 12[$k$]. As a result of exchanging the connection request among respective arbitrary terminal devices 12[$k$] within the acoustic space, the management information A including the terminal information D on the respective terminal devices 12[$k$] is generated, and the review screen G corresponding to the management information A is displayed on the display device 25 of each of the terminal devices 12[$k$]. Therefore, by visually recognizing the review screen G, the user of each of the terminal devices 12[$k$] can grasp the sound recording status information DB and the control variable information DC on each of the terminal devices 12[$k$].

As described above with reference to FIG. 3, each of the terminal devices 12[$k$] receives the status notification (SA1) including the terminal identification information DA and the sound recording status information DB from another terminal. When the status notification is received from another terminal, as exemplified in FIG. 7, the control device 21 of the terminal device 12[$k$] acquires the terminal identification information DA and the sound recording status information DB from the status notification (SD15), and updates the management information A and the review screen G based on the sound recording status information DB (SD16 and SD17). Specifically, the sound recording status information DB within the management information A corresponding to the terminal identification information DA within the status notification is updated to the sound recording status information DB within a current status notification. The transmission of the status notification (SA1) is repeated on each of the K terminal devices 12[1] to 12[K], and hence the management information A on each of the terminal devices 12[$k$] is updated, as needed, to contents on which the sound recording status information DB on another terminal has been reflected. Therefore, the sound recording status information DB displayed on the review screen G fluctuates every moment. A temporal change (time series of the numerical value) of the sound recording status information DB may also be stored in the storage device 22.

When the user instructs to start the sound recording operation through the input device 26 of an arbitrary terminal device 12[$k$], as exemplified in FIG. 6, the control device 21 of the terminal device 12[$k$] determines whether or not the sound-recording-in-process flag F1 is the effective status (on) (SC21). When the sound-recording-in-process flag F1 is the ineffective status ("NO" in Step SC21), the control device 21 generates the identification information QA (SC22), and generates the sound recording identification information QB (SC23). The identification information QA is generated, for example, in accordance with the instruction received from the user, and the sound recording identification information QB is set, for example, in accordance with the sound recording date/time. The identification information QA and the sound recording identification information QB are stored in the storage device 22. The control device 21 changes the sound-recording-in-process flag F1 to the effective status (SC24), and transmits the sound recording start request (request to start the sound recording operation) from the communication device 24 to each of the other terminals (SC25). The sound recording start request includes the sound recording identification information QB generated in Step SC23. On the other hand, when the sound-recording-in-process flag F1 is already in the effective status ("YES" in Step SC21), the control device 21 finishes the first processing SA5 without executing the respective processing steps described above (SC22 to SC25).

When the sound recording start request transmitted from another terminal in the above-mentioned procedure is received, as exemplified in FIG. 7, the control device 21 of the terminal device 12[$k$] determines whether or not the sound-recording-in-process flag F1 is in the effective status (SD21). When the sound-recording-in-process flag F1 is in the ineffective status ("NO" in Step SD21), the control device 21 generates the identification information QA, for example, in accordance with the instruction received from the user (SD22), and acquires the sound recording identification information QB included in the sound recording start request (SD23). The identification information QA and the sound recording identification information QB are stored in the storage device 22. The control device 21 changes the sound-recording-in-process flag F1 to the effective status (SD24). On the other hand, when the sound-recording-in-process flag F1 is already in the effective status ("YES" in Step SD21), the control device 21 finishes the second processing SA7 without executing the respective processing steps described above (SD22 to SD24). As understood from the description made above, when the sound-recording-in-process flag F1 for each of the other terminals is set to the effective status with the instruction to start the sound recording operation issued to an arbitrary one of the terminal devices 12[k] as a trigger, the sound recording operation (SB2) for generating the pieces of acoustic data XA[k] corresponding to the sounds from the sound generating sources S[k] is started in parallel on the K terminal devices 12[1] to 12[K].

When the user instructs to stop the sound recording operation through the input device 26 of an arbitrary terminal device 12[k], as exemplified in FIG. 6, the control device 21 of the terminal device 12[k] determines whether or not the sound-recording-in-process flag F1 is the effective status (SC31). When the sound-recording-in-process flag F1 is the effective status ("YES" in Step SC31), in other words, when the sound recording operation is being executed, the control device 21 changes the sound-recording-in-process flag F1 to the ineffective status (SC32), and changes the sound-recording-stop flag F2 to the effective status (SC33). Therefore, the confirmation operation (SB4) is executed in the subsequent recording processing SB, and the sound recording operation is stopped. In the confirmation operation executed in the subsequent recording processing SB, the identification information QA and the sound recording identification information QB stored in the storage device 22 are added to the piece of acoustic data XA[k]. The control device 21 transmits a sound recording stop request (request to stop the sound recording operation) from the communication device 24 to each of the other terminals (SC34). Then, the control device 21 executes post-recording processing including the editing of the piece of acoustic data XA[k] obtained after the execution of the confirmation operation (SC35), and finishes the first processing SA5. Specific details of the post-recording processing are described later. On the other hand, when the sound-recording-in-process flag F1 is the ineffective status ("NO" in Step SC31), the control device 21 finishes the first processing SA5 without executing the respective processing steps described above (SC32 to SC35).

When the sound recording stop request transmitted from another terminal in the above-mentioned procedure is received, as exemplified in FIG. 7, the control device 21 of the terminal device 12[k] determines whether or not the sound-recording-in-process flag F1 is the effective status (SD31). When the sound-recording-in-process flag F1 is the effective status ("YES" in Step SD31), the control device 21 changes the sound-recording-in-process flag F1 to the ineffective status (SD32), and changes the sound-recording-stop flag F2 to the effective status (SD33). Therefore, in the subsequent recording processing SB, the confirmation operation (SB4) is executed also on each of the terminal devices 12[k] that has received the sound recording stop request, and the sound recording operation is stopped. In the confirmation operation, the identification information QA and the sound recording identification information QB stored in the storage device 22 are added to the piece of acoustic data XA[k]. The control device 21 executes the post-recording processing including the editing of the piece of acoustic data XA[k] obtained after the execution of the confirmation operation (SD35), and finishes the second processing SA7. Specific details of the post-recording processing are described later. On the other hand, when the sound-recording-in-process flag F1 is the ineffective status ("NO" in Step SD31), the control device 21 finishes the second processing SA7 without executing the respective processing steps described above (SD32 to SD35).

The user can instruct the terminal device 12[k] to change the control variable information DC (sound recording level) (variable adjustment) by operating the input device 26. When the user instructs the terminal device 12[k] to adjust the variable, as exemplified in FIG. 6, the control device 21 changes the numerical value of the control variable information DC in accordance with the instruction received from the user through the input device 26 (SC41). Then, the control device 21 transmits the variable adjustment notification from the communication device 24 to each of the other terminals (SC42). The variable adjustment notification includes the terminal identification information DA on the terminal device 12[k] and the control variable information DC obtained after the adjustment by the user.

On the other hand, when the variable adjustment notification transmitted from another terminal in the above-mentioned procedure is received, as exemplified in FIG. 7, the control device 21 of the terminal device 12[k] acquires the terminal identification information DA and the control variable information DC from the variable adjustment notification (SD41), and updates the management information A and the review screen G in accordance with the control variable information DC (SD42 and SD43). Specifically, in the management information A and the review screen G, the control variable information DC corresponding to the terminal identification information DA within the variable adjustment notification is updated to the adjusted control variable information DC acquired from the current variable adjustment notification. Therefore, the respective users can review setting values of the control variable information DC on the respective terminal devices 12[k] in real time.

When the user instructs to finish the processing through the input device 26 of an arbitrary terminal device 12[k], the control device 21 of the terminal device 12[k] finishes the control processing SA and the recording processing SB. The specific examples of the first processing SA5 and the second processing SA7 executed in the control processing SA are described above.

<Post-Recording Processing>

Figure 9:
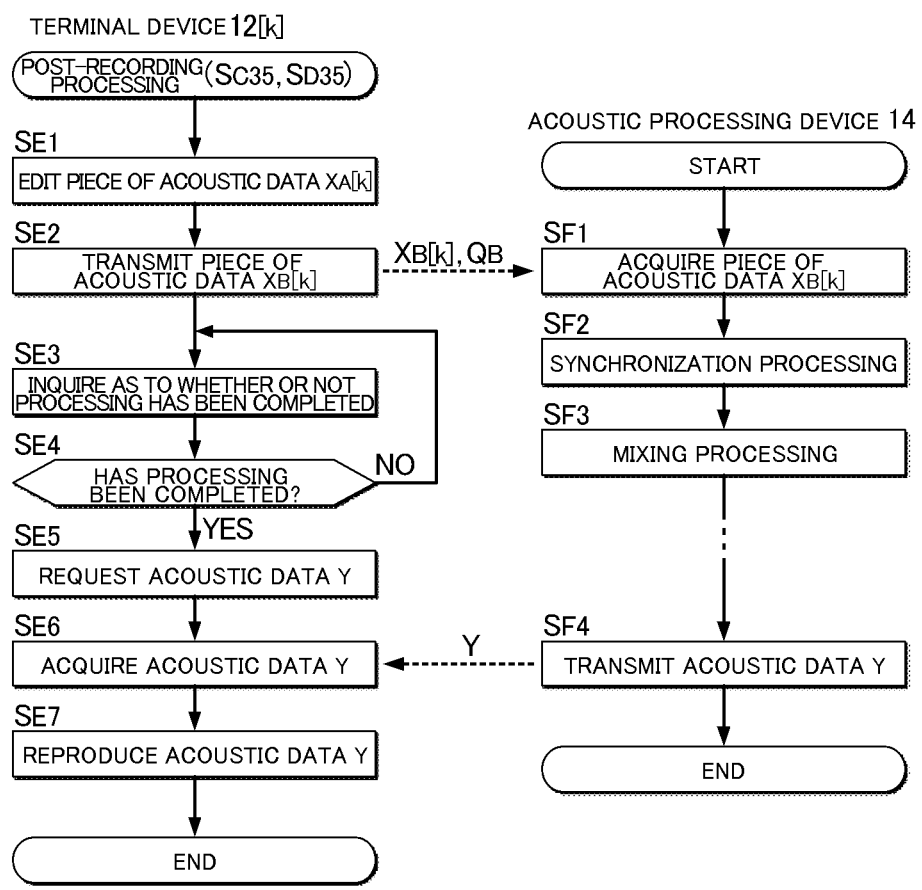
FIG. 9 is a flowchart of post-recording processing.

FIG. 9 is a flowchart of the post-recording processing (SC35 and SD35) executed when the sound recording operation is stopped in the first processing SA5 and the second processing SA7. FIG. 9 illustrates processing executed by the control device 31 of the acoustic processing device 14 in parallel with the post-recording processing.

When the post-recording processing is started, the control device 21 of each of the terminal devices 12[k] generates the piece of acoustic data XB[k] in the edit processing for the piece of acoustic data XA[k] (piece of acoustic data XA[k] obtained after the confirmation performed in the confirmation operation) stored in the storage device 22 (SE1). The sound recording status information DB and the control variable information DC on another terminal defined by the management information A are applied to the edit processing for the piece of acoustic data XA[k]. For example, the control device 21 adjusts the volume of the piece of acoustic data XA[k] so that the volume approaches a mean value of the volumes indicated by the sound recording status information DB on the respective other terminals. Further, the control device 21 adjusts an amplitude of the piece of acoustic data XA[k] based on the control variable information DC (sound recording level) specified by the user of the terminal device 12[k] through the input device 26. Note that, the amplitude of the piece of acoustic data XA[k] may also be adjusted by using the mean value of the control variable information DC on the respective terminal devices 12[k] specified by the management information A as the gain. Further, the control device 21 adds various kinds of sound effects (for example, reverberation effects) to the piece of acoustic data XA[k]. As understood from the description made above, the control device 21 of each of the terminal devices 12[k] functions as an element (editing unit) for editing the piece of acoustic data XA[k] generated by the sound pickup device 27.

The control device 21 of the terminal device 12[k] transmits the piece of acoustic data XB[k] generated in the edit processing for the piece of acoustic data XA[k] from the communication device 23 to the acoustic processing device 14 (SE2). The sound recording identification information QB is added to the piece of acoustic data XB[k] to be transmitted to the acoustic processing device 14. The respective terminal devices 12[k] execute the above-mentioned operation, to thereby transmit the K pieces of acoustic data XB[1] to XB[K] corresponding to the mutually different sound generating sources S[k] to the acoustic processing device 14.

The control device 31 of the acoustic processing device 14 acquires the piece of acoustic data XB[k] obtained after the editing and received from the respective terminal devices 12[k] by the communication device 33, and stores the piece of acoustic data XB[k] in the storage device 32 (SF1). The control device 31 generates the acoustic data Y in acoustic processing for the pieces of acoustic data XB[1] to XB[K] that correspond to one another (SF2 and SF3). The acoustic processing is executed for K pieces of acoustic data XB[1] to XB[K] that have the common sound recording identification information QB added when being transmitted from the respective terminal devices 12[k] (in other words, K pieces of acoustic data XB[1] to XB[K] generated in parallel with one another within a common acoustic space). In other words, the K pieces of acoustic data XB[1] to XB[K] corresponding to common sound recording are discriminated from a large number of pieces of acoustic data XB[k] different in the acoustic space and sound-recorded time based on the sound recording identification information QB. The acoustic processing according to this embodiment includes the synchronization processing SF2 and the mixing processing SF3 as described above with reference to FIG. 2.

As described above, the sound recording operation is started on the K terminal devices 12[1] to 12[K] with the instruction to start the sound recording operation issued to one terminal device 12[k] as a trigger, but a time point at which the recording is actually started may differ among the respective terminal devices 12[k]. The synchronization processing SF2 is processing for synchronizing the sounds expressed by the respective pieces of acoustic data XB[k] with one another on the time axis. For example, as the synchronization processing SF2, it is preferable to adjust the respective pieces of acoustic data XB[k] so that a cross-correlation between arbitrary two respective pieces of acoustic data XB[k] among the K pieces of acoustic data XB[k] becomes maximum. Further, the respective pieces of acoustic data XB[k] may also be synchronized by correcting an error in sampling frequencies of the respective pieces of acoustic data XB[k]. Note that, the error in the sampling frequencies involved in the synchronization processing SF2 is also disclosed in, for example, Miyabe et al., "Efficient Maximum Likelihood Solution Search of Linear Phase Compensation for Blind Synchronization of Asynchronized Recording", Proc. of the Spring Meeting of the Acoustical Society of Japan, p. 733-736, 2013.

On the other hand, the mixing processing SF3 is processing for generating the acoustic data Y by mixing the K pieces of acoustic data XB[1] to XB[K] obtained after the execution of the synchronization processing SF2. Specifically, it is preferred to employ processing (auto mixing) for performing the mixing by automatically adjusting the volume depending on the sound recording status. For example, it is preferred to employ a configuration in which the volumes of the respective pieces of acoustic data XB[k] are adjusted so as to level component values of the respective frequencies in frequency characteristics (spectrum) obtained after the K pieces of acoustic data XB[1] to XB[K] are mixed or a configuration in which the volumes of the respective pieces of acoustic data XB[k] are adjusted so that an inclination of a straight line for approximating the frequency characteristics after the mixing becomes a numerical value within a predetermined range. Note that, in the above-mentioned example, attention is focused on the frequency characteristics, but the respective pieces of acoustic data XB[k] may be mixed with reference to loudness characteristic (ISO 226). For the mixing of the respective pieces of acoustic data XB[k], an auto mixing technology disclosed in, for example, D. Dugan, "Automatic microphone mixing", J. Audio Eng. Soc, vol. 23, no. 6, p. 442-449, 1975 or in J. Scott, et al., "AUTOMATIC MULTI-TRACK MIXING USING LINEAR DYNAMICAL SYSTEMS", Proc. SMC 2011 may also be employed. As understood from the above description, the control device 31 of the acoustic processing device 14 functions as an element (acoustic processing unit) for executing the synchronization processing SF2 and the mixing processing SF3 for the K pieces of acoustic data XB[1] to XB[K] acquired from the respective terminal devices 12[k]. The acoustic data Y generated in the acoustic processing is stored in the storage device 32. Note that, it is possible to omit the synchronization processing SF2.

On the other hand, the control device 21 of each of the terminal devices 12[k] that has transmitted the piece of acoustic data XB[k] (SE2) inquires of the acoustic processing device 14 as to whether or not the acoustic processing has been completed, and acquires an inquiry result (SE3). The inquiry (SE3) of the acoustic processing device 14 is repeated every predetermined time period until it is notified by the acoustic processing device 14 that the acoustic processing has been completed ("NO" in Step SE4). When it is notified by the acoustic processing device 14 that the acoustic processing has been completed ("YES" in Step SE4), the control device 21 of the terminal device 12[k] requests the acoustic processing device 14 for the acoustic data Y obtained after the acoustic processing (SE5). The control device 31 of the acoustic processing device 14 that has received the request from the terminal device 12[k] transmits the acoustic data Y generated in the above-mentioned acoustic processing (SF2 and SF3) to the terminal device 12[k] (SF4). The control device 21 of the terminal device 12[k] acquires the acoustic data Y received from the acoustic processing device 14 by the communication device 23, and stores the acoustic data Y in the storage device 22 (SE6). Then, the control device 21 supplies the acoustic data Y stored in the storage device 22 to the sound emitting device 28 (SE7). Therefore, a mixed sound (musical performance sound of the target musical piece) of the sounds emitted from the K sound generating sources S[1] to S[K] is reproduced from the sound emitting device 28.

As described above, in this embodiment, the sound pickup (generation of the piece of acoustic data XA[k]) for the sounds from the respective sound generating sources S[k] and the edit processing for the pieces of acoustic data XA[k]

are executed on the respective terminal devices 12[k], and then the acoustic processing (synchronization processing SF2 and mixing processing SF3) for consolidating the pieces of acoustic data XB[k] generated by the respective terminal devices 12[k] is executed. This produces an advantage in that the entire configuration of the recording system 100 is simplified (downsized). For example, in the technology disclosed in Japanese Patent Application Laid-open No. 2003-250200, it is necessary to provide a large-scale recording system including sound pickup devices whose number corresponds to a maximum value of a sound pickup channel count (maximum value of a total number of sound generating sources within the acoustic space), while in the first embodiment, the recording of the target musical piece can be realized by providing the terminal devices 12[k] whose number corresponds to a total number of the sound generating sources S[k] within the acoustic space. Further, there is also an advantage in that a communication terminal in widespread use, such as a mobile phone or a smartphone, can be used as the respective terminal device 12[k].

In this embodiment, the respective terminal devices 12[k] uses the information (sound recording status information DB and control variable information DC) acquired from another terminal to execute the edit processing for the piece of acoustic data XA[k]. Therefore, there is an advantage in that the piece of acoustic data XB[k] can be generated in consideration of relationships among the sounds from the respective sound generating sources S[k]. In addition, the information to be used for the edit processing performed by the respective terminal devices 12[k] is exchanged through the short-range wireless communications, which produces an advantage in that, for example, each of the terminal devices 12[k] has higher degrees of freedom of placement position and posture (can be placed more freely with respect to each of the sound generating sources S[k] in terms of position or posture) than in a configuration in which the respective terminal devices 12[k] communicate to/from one another in a wired manner.

Further, the sound recording operation for the pieces of acoustic data XA[k] is started or stopped in accordance with the instruction (instruction to start or stop the sound recording operation) transmitted from an arbitrary one of the terminal devices 12[k] to the respective other terminals, which produces an advantage in that the respective users do not need to perform such complicated work as to instruct the K terminal devices 12[1] to 12[K] to start and stop the sound recording operation in unison.

Modification Example

The above-mentioned embodiment may be modified in various manners. Exemplary aspects of specific modifications are described as follows. At least two aspects arbitrarily selected from the following exemplary aspects may be appropriately combined.

(1) In the above-mentioned embodiment, the acoustic processing for the respective pieces of acoustic data XB[k] is executed by the acoustic processing device 14 (server device) provided separately from the respective terminal devices 12, but the function of the acoustic processing device 14 according to the above-mentioned embodiment may be implemented by an arbitrary one of the terminal devices 12[k] (hereinafter referred to as "target terminal device 12[k]"). In other words, the target terminal device 12[k] generates the acoustic data Y by executing the acoustic processing (synchronization processing SF2 and mixing processing SF3) for the pieces of acoustic data XB received from the other terminals by the communication device 24 and the piece of acoustic data XB[k] generated by the own device, and supplies the acoustic data Y to the sound emitting device 28 of the own device while transmitting the acoustic data Y to each of the other terminals from the communication device 24. According to the above-mentioned configuration, the communications (exchange of the piece of acoustic data XB[k] and the acoustic data Y) between the acoustic processing device 14 and the respective terminal devices 12[k] are unnecessary, which advantageously reduces a processing load (communication traffic) on the communication network 16. On the other hand, according to the configuration in which the acoustic processing device 14 provided separately from the respective terminal devices 12[k] executes the acoustic processing as in the above-mentioned embodiment, which produces an advantage in that there is no need to provide the function of the acoustic processing to the respective terminal devices 12[k] (therefore, each of the terminal devices 12[k] is not required to have high-level arithmetic operation performance). As understood from the description made above, in one or more embodiments of the present invention, the acoustic processing device 14 (server device) or the terminal device 12[k] may include the element (acoustic processing unit) for executing the acoustic processing (synchronization processing SF2 and mixing processing SF3) for the piece of acoustic data XB[k].

(2) The information regarding the edit processing may also be exchanged among the respective terminal devices 12[k]. For example, by transmitting information specified for an arbitrary one of the terminal devices 12[k] by the user from the terminal device 12[k] to the respective other terminals to share the information, a kind and details of the edit processing (numerical values of the variables applied for the edit processing) may be made common across the K terminal devices 12[1] to 12[K].

(3) The details of the edit processing (SE1) and the acoustic processing (SF2 and SF3) are not limited to the above-mentioned examples. For example, processing for substituting a specific segment of the piece of acoustic data XB[k] by other data may be executed as the edit processing. Further, processing for generating the acoustic data Y having an arbitrary channel count (for example, 5.1 ch) may be executed as the mixing processing SF3 in the signal processing for the K pieces of acoustic data XB[1] to XB[K]. In a case of generating the multi-channel acoustic data Y, the respective channels of the acoustic data Y are generated so that each of acoustic images of the sound generating sources S[k] is localized in the position of each of the terminal devices 12[k]. To detect the position of the terminal device 12[k], for example, a Global Positioning System (GPS) mounted to the terminal device 12[k] is used.

(4) In the above-mentioned embodiment, the sound pickup (generation of the piece of acoustic data XA[k]) for the sound from the respective sound generating sources S[k] and the edit processing for the pieces of acoustic data XA[k] are executed on the respective terminal devices 12[k], but the edit processing for the piece of acoustic data XA[k] may be omitted. In other words, the piece of acoustic data XA[k] generated by the sound pickup device 27 may be transmitted to the acoustic processing device 14 by the respective terminal devices 12[k] as the piece of acoustic data XB[k] to be subjected to the synchronization processing SF2 and the mixing processing SF3. Further, a configuration in which a part or all of the edit processing executed by the control device 21 of the terminal device 12[k] in the above-mentioned embodiment is executed by the control device 31 of the acoustic processing device 14 may also be employed.

(5) In the above-mentioned embodiment, the sound recording operation is started and stopped in parallel across the K terminal devices 12[1] to 12[K] by executing the control processing SA and the recording processing SB, but the control processing SA and the recording processing SB may be omitted. In other words, each user may also instruct each of the K terminal devices 12[1] to 12[K] to start and stop the sound recording operation individually. Note that, for example, when the respective users instructs their own terminal devices 12[$k$] to start and stop the sound recording operation at a time of a specific cue such as a shout, start points and end points on the time axis can be roughly the same each other across a plurality of pieces of acoustic data XB[1] to XB[K], but deviations among the respective pieces of acoustic data XB[k] on the time axis may be conspicuous compared with the above-mentioned embodiment for executing the control processing SA and the recording processing SB. In consideration of the above-mentioned tendency, in the configuration in which the control processing SA and the recording processing SB are omitted, it is preferable to employ a configuration in which synchronization processing that is preferred when the deviations among the respective pieces of acoustic data XB[k] on the time axis are conspicuous be executed with the synchronization processing exemplified in the above-mentioned embodiment (or in place of the synchronization processing). As the synchronization processing used when the deviations among the respective pieces of acoustic data XB[k] are conspicuous, it is preferred to employ, for example, a method (alignment using downsampling and cross-correlation) disclosed in P. Misra, et al., "Efficient Cross-Correlation Via Sparse Representation In Sensor Networks", IPSN 2012.

(6) By picking up the mixed sound of the sounds from the K sound generating sources S[1] to S[K] with a sound pickup device (hereinafter referred to as "sound pickup device for reference") placed in a position spaced apart from the respective sound generating sources S[k] (for example, auditorium spaced apart from a stage on which the K sound generating sources S[1] to S[K] are situated), it is also possible to apply the sound pickup result obtained by the sound pickup device for reference to the mixing processing. For example, a configuration in which a volume ratio among the respective sound generating sources S[k] is estimated from the mixed sound picked up by the sound pickup device for reference and the K pieces of acoustic data XB[1] to XB[K] are mixed at the volume ratio of the respective sound generating sources S[k] is employed. It is preferred that a communication terminal such as a mobile phone or a smartphone be used as the sound pickup device for reference similarly to the terminal device 12[$k$] according to the above-mentioned embodiment. Further, the acoustic processing device 14 may also generate the acoustic data Y by mixing the acoustic data on the sound picked up by the sound pickup device for reference with the K pieces of acoustic data XB[1] to XB[K] transmitted from the respective terminal devices 12. According to the above-mentioned configuration, effects such as an overall atmosphere and reverberation sound within the acoustic space can be added to the acoustic data Y.

(7) The piece of acoustic data XA[k] and the piece of acoustic data XB[k] have an arbitrary format (audio coding method). Further, the format of the piece of acoustic data XA[k] and the piece of acoustic data XB[k] may also be changed appropriately. For example, in a first operation mode, the acoustic data Y is generated by transmitting the piece of acoustic data XB[k] based on an audio coding method (for example, MP3 format) having a high compressibility to the acoustic processing device 14, while in a second operation mode, the acoustic data Y is generated by transmitting the piece of acoustic data XB[k] based on an audio coding method (for example, WAV format) having a low compressibility to the acoustic processing device 14. According to the above-mentioned configuration, for example, it is possible to take such a measure that the first operation mode is used at a time of previewing the musical performance sound of the target musical piece and that the second operation mode is used to generate the final acoustic data Y when a preview result is satisfactory. In the first operation mode, efficient communications are implemented by reducing a data amount of the piece of acoustic data XB[k], while the acoustic data Y having high sound quality can be generated in the second operation mode. Further, the format of the piece of acoustic data XA[k] and the piece of acoustic data XB[k] may also be changed in accordance with a communication environment. For example, the piece of acoustic data XB[k] based on the audio coding method (for example, MP3 format) having a high compressibility is transmitted from the terminal device 12[$k$] to the acoustic processing device 14 by a communication method such as 4th generation (4G) or long term evolution (LTE), while the piece of acoustic data XB[k] based on the audio coding method (for example, WAV format) having a low compressibility is transmitted from the terminal device 12[$k$] to the acoustic processing device 14 in an environment in which a communication method such as Wi-Fi is available.

(8) In the above-mentioned embodiment, the acoustic processing (synchronization processing SF2 and mixing processing SF3) is executed for the K pieces of acoustic data XB[1] to XB[K] that have the common sound recording identification information QB, but a configuration in which the user arbitrarily selects the piece of acoustic data XB[k] to be subjected to the acoustic processing may also be employed. For example, the pieces of acoustic data XB[k] on the respective musical performance parts are transmitted from the respective terminal devices 12[$k$] to the acoustic processing device 14 for each of performances of the target musical piece obtained a plurality of times, and the piece of acoustic data XB[k] selected by the user of the terminal device 12[$k$] is extracted from among a plurality of pieces of acoustic data XB[k] recorded in mutually different performances for each of the musical performance parts of the target musical piece, to thereby cause the control device 31 of the acoustic processing device 14 to execute the synchronization processing SF2 and the mixing processing SF3. According to the above-mentioned configuration, there is an advantage in that it is possible to generate the musical performance sound of the target musical piece by combining the pieces of acoustic data XB[k] on the best one of the performances obtained a plurality of times on a musical performance part basis. Note that, in the configuration in which the K pieces of acoustic data XB[1] to XB[K] are selectively used to generate the acoustic data Y as described above, a total number of the pieces of acoustic data XB[k] applied to the generation of the acoustic data Y may fall below a total number K of the terminal devices 12[$k$] used for the sound recording operation.

(9) In the above-mentioned embodiment, the configuration in which the sound recording status information DB (volume of the piece of acoustic data XA[k]) on each of the terminal devices 12[$k$] are displayed on the review screen G is described as an example, but a method of informing the user of the sound recording status of each of the terminal devices 12[k] is not limited to the above-mentioned example. For example, a configuration in which each of the terminal devices 12[k] informs the user of an abnormality when the situation in which the status notification has kept failing to be received from an arbitrary one of the terminal devices 12[k] for a predetermined time period or when the volume expressed by the sound recording status information DB has kept falling below a threshold value for a predetermined time period (when it is estimated that the on-mic sound recording status is not maintained) is employed. A method of informing of the abnormality is arbitrary, and, for example, a method of informing by voice or image or a method of turning on an illumination device (for example, LED for illuminating a subject) for image pickup mounted to the terminal device 12[k] is employed. Further, it is also preferred to employ a configuration in which the respective other terminals are notified by the communication device 24 when a battery remaining amount of an arbitrary one of the terminal devices 12[k] falls below a predetermined value or a configuration in which the user of the terminal device 12[K] is informed and the respective other terminals are notified by the communication device 24 when the volume of a sound (overlapping sound) that has reached from a sound generating source S[k] other than the target sound generating source S[k] is large.

(10) Within the piece of acoustic data XA[k] generated in the sound recording operation, information (hereinafter referred to as "auxiliary information") specifying a time point corresponding to the instruction received from the user through the input device 26 may be added as needed during the execution of the recording operation. For example, when the user operates the input device 26 at an arbitrary time point during the execution of the sound recording operation (control processing SA and recording processing SB), the control device 21 of the terminal device 12[k] adds the auxiliary information to the piece of acoustic data XA[k] at the time point. For example, the auxiliary information is added to the start point and the end point of a musically problematic segment (for example, segment in which a mistake has been made in the performance) within the sound from the sound generating source S[k]. According to the above-mentioned configuration, a segment within the piece of acoustic data XA[k] (piece of acoustic data XB[k]) defined by the auxiliary information can be substituted by another performance, and a segment within the piece of acoustic data XA[k] in which the performance is not appropriate can be reviewed after the performance. Further, it is preferred to employ a configuration that allows the user to perform review afterward by including a character string (comment) specified by the user in the auxiliary information.

(11) In the above-mentioned embodiment, the recording of the sound is described as an example, but it is possible to record an image (typically, moving image) along with the sound. For example, the sound generating source S[k] and a surrounding image are photographed by an image pickup device mounted to the respective terminal devices 12[k]. Further, the image photographed by the respective terminal devices 12[k] may be distributed, for example, from a video distribution website to indefinite terminals. Specifically, it is preferred to employ a configuration in which the moving image obtained by coupling the images photographed at the respective terminal devices 12[k] as materials (so-called video jockey (VJ) materials) to one another on the time axis is distributed with the sound of the acoustic data Y obtained after the acoustic processing. Further, temporal changes in the sound recording status information DB and the control variable information DC may be superimposed on the image to be displayed.

Figure 10:
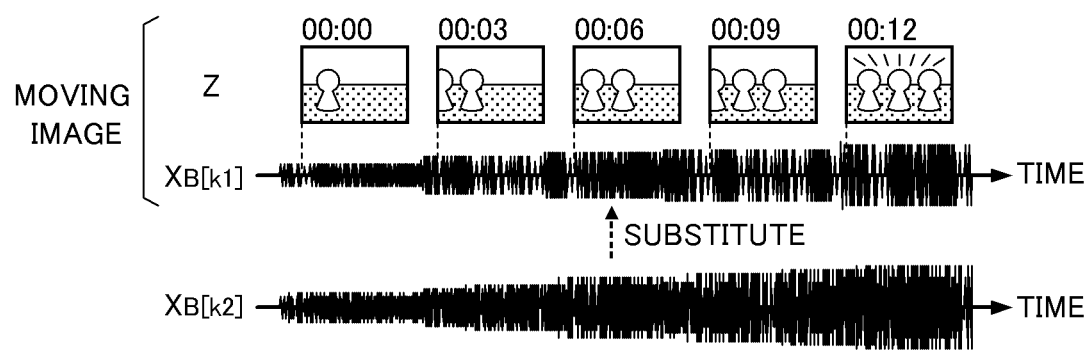
FIG. 10 is an explanatory diagram of an operation according to a modification example.

Further, as exemplified in FIG. 10, a piece of acoustic data XB[k1] included in the moving image recorded by a terminal device 12[k1] (k1=1 to K) with image data Z and a piece of acoustic data XB[k2] generated by a terminal device 12[k2] (k2≠k1) may be subjected to the mixing processing SF3. For example, the piece of acoustic data XB[k1] and the piece of acoustic data XB[k2] are mixed (weight summed) in the mixing processing SF3 with a mixture ratio (gain) of the piece of acoustic data XB[k1] set to a numerical value of approximately 0 and a mixture ratio of the piece of acoustic data XB[k2] set to a numerical value of approximately 1, to thereby generate the moving image in which the piece of acoustic data XB[k1] is substituted by the piece of acoustic data XB[k2]. For example, when an acoustic device for a PA system including the sound pickup device 27 having higher performance than the terminal device 12[k1] (for example, smartphone or video camera) is used as the terminal device 12[k2], it is possible to generate the moving image in which the sound (relatively low-quality sound) of the moving image recorded by the terminal device 12[k1] is substituted by the high-quality sound recorded by the terminal device 12[k2]. For example, a situation is assumed in which a spectator of an event such as a concert uses his/her own terminal device 12[k1] to record the moving image while a host of the event uses a high-performance terminal device 12[k2].

(12) The acoustic processing device 14 may also generate new acoustic data Y by executing the mixing processing SF3 by using the piece of acoustic data XB[k], which is obtained by the terminal device 12[k] editing the musical performance sound recorded thereby when the user of the terminal device 12[k] is performing the musical performance part of the target musical piece while listening to a reproduced sound of the acoustic data Y generated by the acoustic processing device 14, in place of the piece of recorded acoustic data XB[k] (in other words, piece of acoustic data XB[k] used to generate the existing acoustic data Y). Note that, the substitution of the piece of acoustic data XB[k] is exemplified in the description made above, but it is also possible to generate new acoustic data Y (add a musical performance part) by executing the mixing processing SF3 while adding the piece of acoustic data XB[k] obtained by recording and editing the sound of the musical performance part different from the existing piece of acoustic data XB[k] to the K pieces of recorded acoustic data XB[1] to XB[K].

(13) In the above-mentioned embodiment, the piece of acoustic data XA[k] (XB[k]) expressing the waveform of the sound emitted from the sound generating source S[k] is described as an example, but the format of the piece of acoustic data XA[k] is not limited to the above-mentioned example. For example, in a configuration in which an electronic musical instrument compatible with Musical Instrument Digital Interface (MIDI) standards is used as the sound generating source S[k], time-series data having a MIDI format for specifying a pitch and play/mute of a sound in time series is generated as the piece of acoustic data XA[k]. As understood from the description made above, the sound pickup device 27 according to the above-mentioned embodiment and the electronic musical instrument such as a MIDI instrument are comprehensively expressed as an element (recording unit) for generating the piece of acoustic data XA[k] expressing the sound.

(14) In the above-mentioned embodiment, the case where the sound generating source S[k] and the terminal device 12[k] correspond to each other on a one-to-one basis is described as an example, but the correspondence between the sound generating source S[k] and the terminal device 12[k] is not limited to the above-mentioned example. For example, it is also possible to employ a configuration in which one terminal device 12[k] is placed for a plurality of sound generating sources S[k] or a configuration in which a plurality of terminal devices 12[k] are placed for one sound generating source S[k].

(15) In the above-mentioned embodiment, the case where the K terminal devices 12[1] to 12[K] (sound generating sources S[1] to S[K]) are situated within a common acoustic space is described as an example, but one or more embodiments of the present invention may also be applied to a case where a part of the K terminal devices 12[k] is situated in a space different from another terminal. For example, the sound recording operation may be executed on the respective terminal devices 12[k] in parallel by causing the plurality of terminal devices 12[k] situated within mutually different acoustic spaces to communicate to/from one another (for example, communicate through the communication network 16).

(16) In the above-mentioned embodiment, the configuration in which different communication methods are used between the communication device 23 and the communication device 24 of the terminal device 12[k] is described as an example, but the communication methods between the terminal device 12[k] and the acoustic processing device 14 and the communication methods between the respective terminal devices 12[k] may be made common. For example, a configuration in which the communications through the communication network 16 are executed between the respective terminal devices 12[k] and the acoustic processing device 14 in the same manner as in the above-mentioned embodiment and are executed also among the plurality of terminal devices 12[k] is employed. Further, a configuration in which the short-range wireless communications are executed among the respective terminal devices 12[k] in the same manner as in the above-mentioned embodiment and are executed also between the respective terminal devices 12[k] and the acoustic processing device 14 can also be employed. Therefore, the configuration in which the communication device 23 and the communication device 24 are separately provided to the terminal device 12[k] may not be essential, and a single communication device may be used for the communications to/from the acoustic processing device 14 and the communications to/from another terminal device 12[k].

Note that, a recording system according to one or more embodiments of the present invention may include a plurality of portable terminal devices situated within an acoustic space. Each of the plurality of portable terminal devices includes a recording unit configured to generate a piece of acoustic data representing a sound and an editing unit for editing the piece of acoustic data. The recording system also includes an acoustic processing unit configured to acquire the pieces of acoustic data obtained after the editing performed by the editing unit from the plurality of portable terminal devices, respectively, and execute synchronization processing for synchronizing the respective pieces of acoustic data and mixing processing for mixing a plurality of pieces of acoustic data for which the synchronization processing has been executed. With the above-mentioned configuration, generation and editing of the acoustic data are executed by the respective terminal devices, and the synchronization processing and the mixing processing are executed for the acoustic data obtained after the editing performed by the respective terminal devices. This produces an advantage in that the entire configuration is simplified (downsized) compared with the related-art recording system in which a large number of sound pickup devices are connected to one another.

Further, the acoustic processing unit may be provided to an acoustic processing device communicable to/from each of the plurality of terminal devices through a communication network, and may execute the synchronization processing and the mixing processing for the pieces of acoustic data received from the respective terminal devices through the communication network. With the above-mentioned configuration, the acoustic processing device that communicates to/from the respective terminal devices through the communication network executes the synchronization processing and the mixing processing for the pieces of acoustic data received from the respective terminal devices, which eliminates the need for the respective terminal devices to execute the synchronization processing and the mixing processing. This produces an advantage in that the configuration of the terminal device is simplified. However, a configuration in which any one of the plurality of terminal devices executes the synchronization processing and the mixing processing for the acoustic data generated by the own device and the acoustic data received from another terminal (configuration in which the function of the acoustic processing device is provided to the terminal device) may be employed.

In addition, each of the plurality of terminal devices may perform the short-range wireless communications to/from another terminal, and the editing unit may edit the acoustic data by using the information acquired from another terminal through the short-range wireless communications. In the above-mentioned aspect, the information exchanged among the respective terminal devices through the short-range wireless communications is applied to the editing of the acoustic data performed by the respective terminal devices, which can realize the editing in consideration of relationships in sound pickup status among the respective terminal devices.

In addition, each of the plurality of terminal devices may perform the short-range wireless communications to/from another terminal, and may start recording the acoustic data generated by the recording unit in accordance with the instruction transmitted from another terminal through the short-range wireless communications. In the above-mentioned aspect, the recording of the acoustic data is started on the respective terminal devices in accordance with the instruction exchanged among the respective terminal devices through the short-range wireless communications, which can synchronize the pieces of acoustic data on the respective terminal devices with ease (or eliminate the need for the synchronization processing).

Note that, the recording system according to each of the above-mentioned aspects may be implemented by hardware (electronic circuit) such as a digital signal processor (DSP) dedicated to the recording, and may also be implemented by cooperation between a general-purpose processor such as a central processing unit (CPU) and a program. The program according to one or more embodiments of the present invention may be provided in the form of being stored in a computer-readable recording medium to be installed into a computer. The recording medium is, for example, a non-transitory recording medium, preferred examples of which include an optical recording medium (optical disc) such as a CD-ROM, and can include a known recording medium having an arbitrary format such as a semiconductor recording medium or a magnetic recording medium. The program according to one or more embodiments of the present invention may be, for example, provided in the form of being distributed through the communication network to be installed into the computer. Further, one or more embodiments of the p resent invention may be identified as an operation method (recording method) for the recording system according to each of the aspects described above.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A recording method, comprising:
   acquiring each piece of acoustic data representing a sound from each of a plurality of portable terminal devices, the each of the plurality of portable terminal devices comprising a sound pickup device configured to generate the piece of acoustic data and configured to share management information with one or more of the other portable terminal devices, wherein the management information is stored in respective portable terminal devices and the management information includes one or more of: (i) a sound recording status information indicating a sound recording status of the respective piece of acoustic data and (ii) control variable information specifying a numerical value of a variable, the management information applied by the respective portable terminal devices to edit the respective piece of acoustic data;
   executing synchronization processing for synchronizing the respective pieces of acoustic data; and
   executing mixing processing for mixing a plurality of pieces of acoustic data for which the synchronization processing has been executed, and
   in the synchronization processing, adjusting the respective pieces of acoustic data so that a cross-correlation between the respective pieces of acoustic data becomes maximum.

2. The recording method according to claim 1, wherein:
   the executing of the synchronization processing and the executing of the mixing processing are carried out by at least one processor comprised in an acoustic processing device communicable to/from the each of the plurality of portable terminal devices through a communication network; and
   the executing of the synchronization processing executes the synchronization processing for the pieces of acoustic data received from the plurality of portable terminal devices through the communication network, respectively.

3. The recording method according to claim 1, further comprising editing the piece of acoustic data generated by the sound pickup device,
   wherein the executing of the synchronization processing comprises acquiring the edited pieces of acoustic data from the plurality of portable terminal devices, respectively, and executing the synchronization processing for synchronizing the respective acquired pieces of acoustic data.

4. The recording method according to claim 3, wherein:
   the plurality of portable terminal devices are each configured to perform short-range wireless communications to/from another terminal among the plurality of portable terminal devices; and
   the editing comprises editing the piece of acoustic data by using information acquired from the other terminal through the short-range wireless communications.

5. The recording method according to claim 1, wherein:
   the plurality of portable terminal devices are each configured to perform short-range wireless communications to/from another terminal among the plurality of portable terminal devices; and
   the recording method further comprises starting to record the piece of acoustic data generated by the sound pickup device in accordance with an instruction transmitted from the other terminal through the short-range wireless communications.

6. A recording system, comprising:
   a plurality of portable terminal devices, each of the plurality of portable terminal devices comprising a sound pickup device configured to generate a piece of acoustic data representing a sound and configured to share management information with one or more of the other portable terminal devices, wherein the management information is stored in respective portable terminal devices and the management information includes one or more of: (i) a sound recording status information indicating a sound recording status of the respective piece of acoustic data and (ii) control variable information specifying a numerical value of a variable, the management information applied by the respective portable terminal devices to edit the respective piece of acoustic data;
   at least one processor executing stored instructions to:
      acquire the pieces of acoustic data from the plurality of portable terminal devices, respectively, and execute synchronization processing for synchronizing the respective pieces of acoustic data; and
      execute mixing processing for mixing a plurality of pieces of acoustic data for which the synchronization processing has been executed, and
      in the synchronization processing, adjust the respective pieces of acoustic data so that a cross-correlation between the respective pieces of acoustic data becomes maximum.

7. The recording system according to claim 6, wherein the at least one processor is comprised in an acoustic processing device communicable to/from the each of the plurality of portable terminal devices through a communication network, and executes the synchronization processing for the pieces of acoustic data received from the plurality of portable terminal devices through the communication network, respectively.

8. The recording system according to claim 6, wherein:
   the each of the plurality of portable terminal devices is configured to edit the piece of acoustic data generated by the sound pickup device; and
   the at least one processor further executes instructions to acquire the edited pieces of acoustic data from the plurality of portable terminal devices, respectively, and execute the synchronization processing for synchronizing the respective acquired pieces of acoustic data.

9. The recording system according to claim 8, wherein:
   the plurality of portable terminal devices are each configured to perform short-range wireless communications to/from another terminal among the plurality of portable terminal devices; and
   edit the piece of acoustic data by using information acquired from the other terminal through the short-range wireless communications.

10. The recording system according to claim 6, wherein:
the plurality of portable terminal devices are each configured to perform short-range wireless communications to/from another terminal among the plurality of portable terminal devices; and
the each of the plurality of portable terminal devices starts to record the piece of acoustic data generated by the sound pickup device in accordance with an instruction transmitted from the other terminal through the short-range wireless communications.

11. A non-transitory computer-readable storage medium having stored thereon a recording program which, when executed by at least one processor carries out instructions to:
acquire each piece of acoustic data representing a sound from each of a plurality of portable terminal devices, the each of the plurality of portable terminal devices comprising a sound pickup device configured to generate the piece of acoustic data and configured to share management information with one or more of the other portable terminal devices, wherein the management information is stored in respective portable terminal devices and the management information includes one or more of: (i) a sound recording status information indicating a sound recording status of the respective piece of acoustic data and (ii) control variable information specifying a numerical value of a variable, the management information applied by the respective portable terminal devices to edit the respective piece of acoustic data;
execute synchronization processing for synchronizing the respective pieces of acoustic data; and
execute mixing processing for mixing a plurality of pieces of acoustic data for which the synchronization processing has been executed, and
in the synchronization processing, adjust the respective pieces of acoustic data so that a cross-correlation between the respective pieces of acoustic data becomes maximum.

12. An acoustic processing method, comprising:
acquiring a plurality of pieces of acoustic data from a plurality of terminal devices and each of the plurality of terminal devices configured to share management information with one or more of the other terminal devices, wherein the management information is stored in respective terminal devices and the management information includes one or more of: (i) a sound recording status information indicating a sound recording status of the respective piece of acoustic data and (ii) control variable information specifying a numerical value of a variable, the management information applied by the respective terminal devices to edit the respective piece of acoustic data;
synchronizing the acquired plurality of pieces of acoustic data; and
mixing the plurality of pieces of acoustic data for which the synchronizing has been executed, and
in the synchronizing, adjusting the respective pieces of acoustic data so that a cross-correlation between the respective pieces of acoustic data becomes maximum.

13. An acoustic processing device, comprising:
at least one processor executing stored instructions to:
acquire a plurality of pieces of acoustic data from a plurality of terminal devices and each of the plurality of terminal devices configured to share management information with one or more of the other terminal devices, wherein the management information is stored in respective terminal devices and the management information includes one or more of: (i) a sound recording status information indicating a sound recording status of the respective piece of acoustic data and (ii) control variable information specifying a numerical value of a variable, the management information applied by the respective terminal devices to edit the respective piece of acoustic data;
execute synchronizing the acquired plurality of pieces of acoustic data; and
mix the plurality of pieces of acoustic data for which the synchronizing has been executed, and
in the synchronization, adjust the respective pieces of acoustic data so that a cross-correlation between the respective pieces of acoustic data becomes maximum.

14. The recording method according to claim 1, wherein the sound recording status information specifies a volume of the piece of acoustic data generated by the sound pickup device.

15. The recording method according to claim 1, wherein the management information is updated, as needed, based on short-range wireless communications so that the management information maintains same content across the terminal devices.

* * * * *